A. HUBERT.
TRACTOR.
APPLICATION FILED MAR. 4, 1916.

1,258,221.

Patented Mar. 5, 1918.
3 SHEETS—SHEET 2.

Inventor
Andrew Hubert
By Moulton & Livrance
Attorneys.

A. HUBERT.
TRACTOR.
APPLICATION FILED MAR. 4, 1916.
1,258,221.
Patented Mar. 5, 1918.
3 SHEETS—SHEET 3.
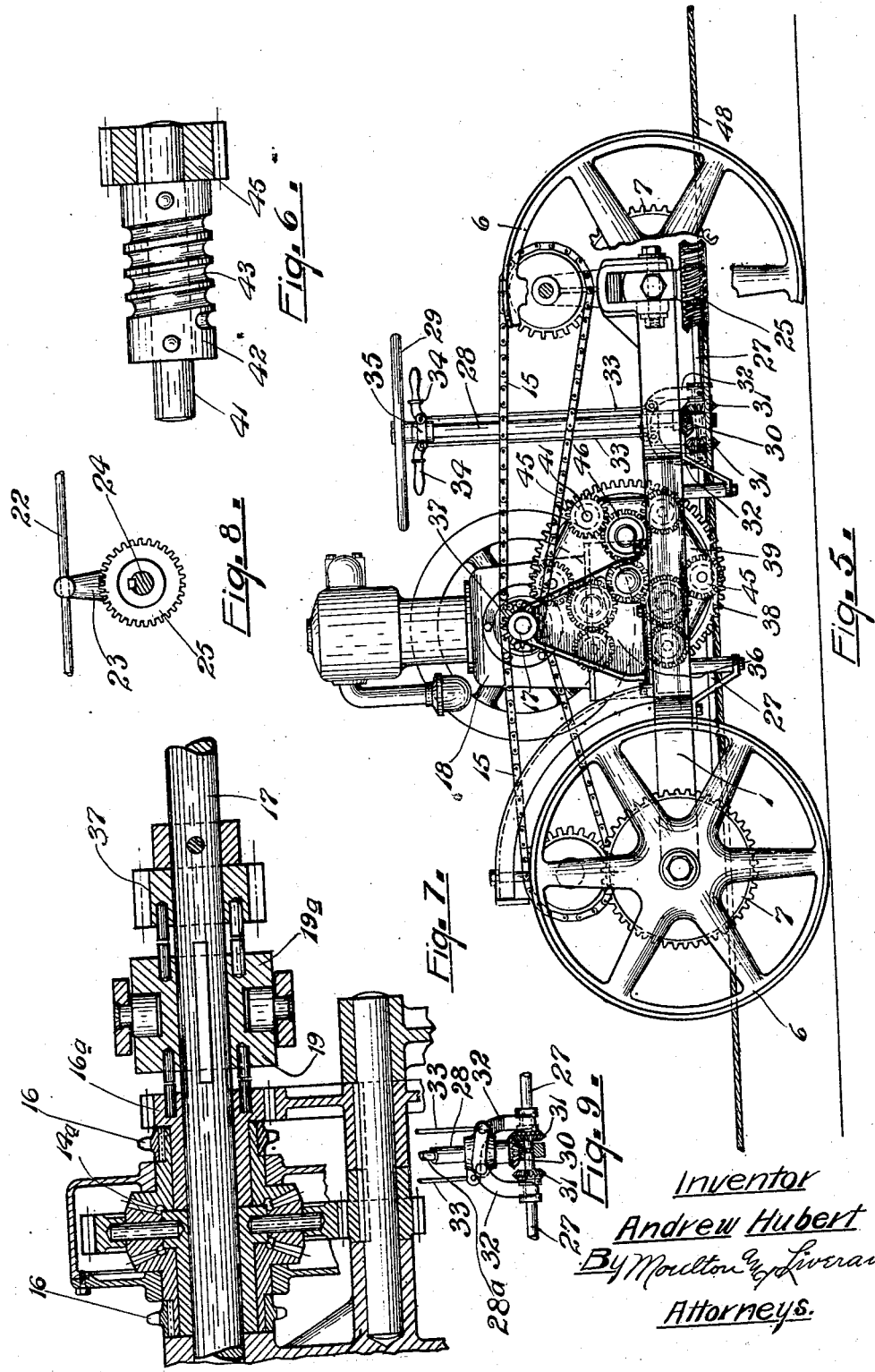
Inventor
Andrew Hubert
By Moulton & Severance
Attorneys

UNITED STATES PATENT OFFICE.

ANDREW HUBERT, OF SPARTA, MICHIGAN.

TRACTOR.

1,258,221.　　　　Specification of Letters Patent.　　Patented Mar. 5, 1918.

Application filed March 4, 1916. Serial No. 82,220.

*To all whom it may concern:*

Be it known that I, ANDREW HUBERT, a citizen of the United States of America, residing at Sparta, in the county of Kent and State of Michigan, have invented certain new and useful Improvements in Tractors; and I do hereby declare the following to be a full, clear, and exact description of the invention, such as will enable others skilled in the art to which it appertains to make and use the same.

This invention relates to tractors. It is an object and purpose of my invention to provide a tractor which may be moved by a direct connection of an engine carried by the tractor with all of the wheels thereof and which also, while it is being used at work, may be moved back and forth across a field by use of a cable attached to suitable anchors at each end of the field. A further object of the invention resides in many details of construction whereby these operations may be performed together with various other novel features of operation such as the moving of the tractor laterally at each end of the field substantially at right angles to the path of movement which it takes in going back and forth across the field; in the provision of novel means for changing the direction of the wheels at each end of the tractor either separately or together, and particularly in a novel construction which, driven by the engine, acts upon the cable to move the tractor over the ground to perform the work thereon. All of these features together with others not specifically enumerated will appear as understanding is had of the embodiment of the invention disclosed in the accompanying drawings, in which;

Fig. 5 is a side elevation of the tractor.

Fig. 6 is a view of one of the rolls, a plurality of which are used in the cable winding mechanism of the tractor.

Fig. 7 is a vertical section taken through the clutch mechanism for connecting the engine for direct drive of the tractor or with the cable drive therefor.

Fig. 8 is a plan of a detail of construction used in the steering apparatus; and Fig. 9 is a side elevation of a detail of structure used in connecting the steering apparatus with the wheels at either or both ends of the tractor.

Like reference characters refer to like parts throughout the several views of the drawings.

Figure 1:
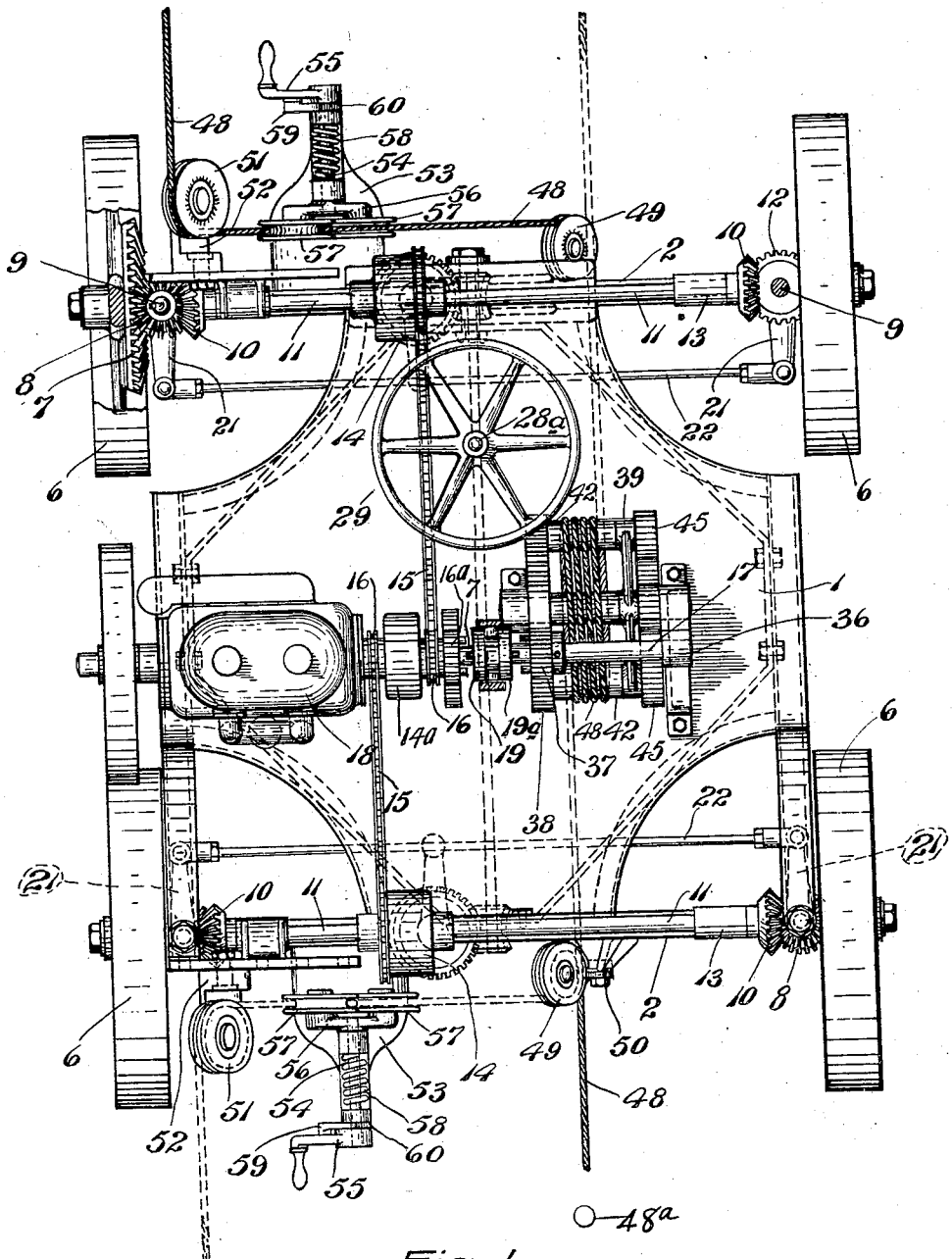
Figure 1 is a plan view of a tractor made in accordance with my invention.

In the construction as shown a platform 1 is provided at each side being supported by transverse axles 2 which at their ends are formed with forks 3 between the arms of which are pivotally mounted the knuckles 4, each having a spindle 5 entering the hub of a wheel 6, each wheel on its inner face carrying a comparatively large bevel gear 7.

A small bevel pinion 8 is connected to a shaft 9 which is positioned vertically and extends through the vertical portion of the knuckle 4 previously described, there being one of these pinions and shafts for each wheel 6. Meshing with each pinion 8 is a pinion 10 secured at the end of a horizontal shaft 11, said shafts being mounted above the table 1 and carried by suitable brackets 13. Below each pinion 8 is a slightly larger pinion 12 which meshes with the bevel gear 7 previously described. Shafts 11 at their meeting ends, substantially midway between the sides of the platform 1, are connected by any suitable differential mechanism within the case 14, this mechanism, as it forms no part of the invention, not being specifically shown or described. The shafts are driven by the chains 15 passing around sprockets 16 loosely mounted on the engine shaft 17 which in turn is driven by an engine 18 of any suitable type, preferably a reversible internal combustion engine. A clutch is splined on the shaft 17 and has a clutch face 19 adapted to engage with a similar face on a wheel 16ª loosely mounted on shaft 17, this clutch being operable by a lever 20 so as to engage with and connect the driven shaft with the differential mechanism shown as driving the sprocket wheels whereby when the engine is running all of the wheels 6 will be driven in the same direction.

Arms 21 are connected to or cast integral with the knuckles 4 and extend inwardly, the arms for each axle being connected by a cross rod 22. An arm 23 mounted on a vertical shaft 24 is attached at its end to each rod 22 between the ends thereof, said shafts 24 being mounted on the axles 2 and near its lower end but above the arm 23 having a worm gear 25 keyed thereto. Meshing with each worm gear is a worm 26 fixed to the end of a shaft 27, said shafts extending toward each other and coming together underneath the platform 1. Extending upwardly from the platform is a vertical sleeve 28 in which is mounted the shaft 28$^a$, its upper end having a steering wheel 29 fastened thereto while at its lower end below the table it carries a bevel pinion 30. Splined on each shaft 27 is a bevel pinion 31, each being connected with a bell crank lever 32 pivotally mounted on the sleeve 28 and operable by the vertical rods 33 which, extending alongside the sleeve 28 are connected at their upper ends to operating handles 34 pivotally connected to a sleeve 35 immediately below the wheel 29. By operation of either one or both handles 34 either one or both of the pinions 32 may be made to engage with the pinion 30 and in this manner either pair of wheels at an end of the platform or both of the pairs of wheels may be made to change direction on turning the steering wheel 29. The construction is such that the wheels 6 may be turned at practically right angles to their position shown in Fig. 1 and the entire tractor moved laterally a desired distance equal to the width of the ground operated upon by any suitable tools drawn by the tractor when the end of the field is reached; and this movement of the tractor sidewise will be accomplished by a direct drive of the wheels through the mechanism just described when it is connected to the engine.

Figures 3, 4:
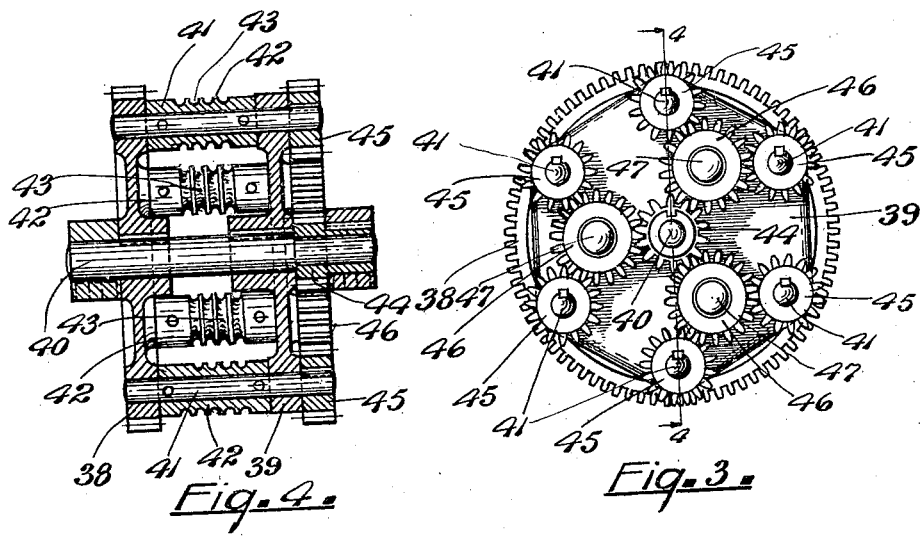
Fig. 3 is an end elevation of the cable winding mechanism.
Fig. 4 is a vertical sectional view taken on the line 4—4 of Fig. 3.
Figure 2:
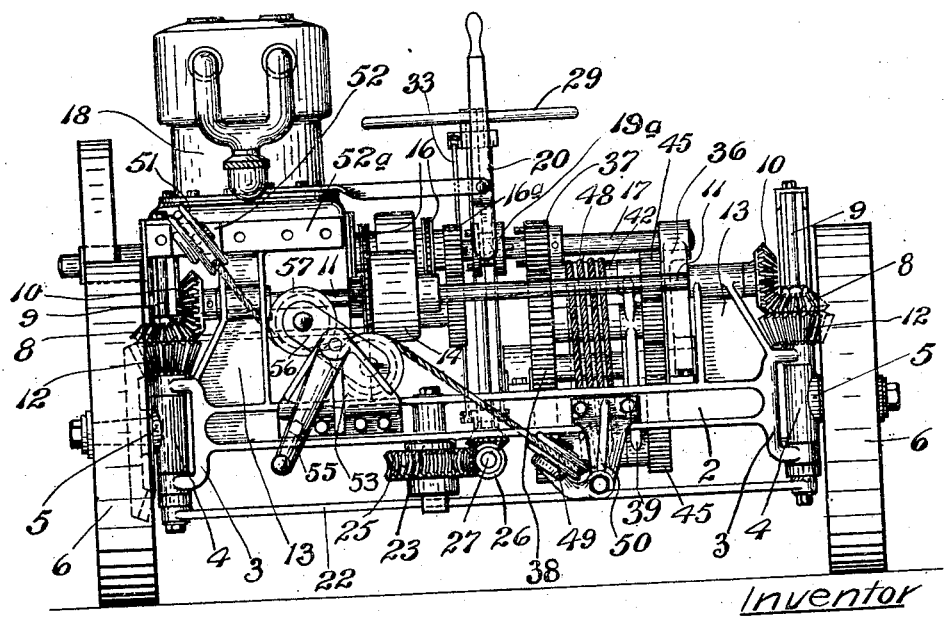
Fig. 2 is a rear elevation thereof.

The engine shaft 17 is extended for a distance beyond the clutch 19, its end being mounted in any suitable bearing in the bracket 36. Loosely mounted upon the shaft 17 is a pinion 37 which engages with a large gear 38, this gear being mounted together with a plate 39 on a shaft 40 which at its ends is supported by any suitable journal brackets carried by the platform 1. Gear 38 and plate 39 are spaced apart a distance and between them are located a plurality of short shafts 41 rotatably mounted at their ends in said gear and plate and each having a roller 42 fixed thereon which for a portion of its length is formed with a helical groove 43 as shown in Fig. 6. The central shaft 40 at its end beyond the plate 39 carries a spur gear 44 which is held stationary on the journal box for the shaft and each of the shafts 41 at its end carries a similar gear 45 of the same size as shown in Fig. 3. There are six of the shafts 41 and accordingly six gears 45. Idle pinions 46, three in number are mounted on studs 47 projecting outwardly from the plate 49, each of these idle pinions meshing with the central gear 44 and with two of the gears 45. This construction is fully disclosed in Fig. 3.

A cable 48 is wound around the reel formed by gear 38, plate 39, and the cross members 41 and 42, said cable being turned several times around the reel and seating in the grooves 43 of the rollers 42. At each end of the platform substantially in alinement with the cable as it leaves the reel is a roller 49 mounted on a bracket 50. Similarly adjacent one side of the platform at each end is a roller 51 mounted on a bracket 52 and this bracket may be adjusted to several different positions on the plate 52$^a$, to correspond with the width that is worked by the tractor as it moved across the field. Between rollers 49 and 51 a bracket 53 is connected to each axle 2, it carrying a divided shaft 54 which at its outer end is provided with a crank 55 and at its inner end with a fork or plate 56 on which is mounted two pulleys 57. A strong coil spring 58 is attached to the two parts of the divided shaft and a pawl 59 on the crank 55 engages with a ratchet 60 for holding the crank in position when it is turned to increase the tension in spring 58.

The operation of the tractor may now be set forth. The end of the cable 48, shown in full lines in Fig. 1, which is in direct alinement with the winding reel is carried across the field and secured to any suitable anchor as post 48$^a$. By moving the clutch so that its clutch face 19$^a$ positioned oppositely and similar to the face 19 engages with the clutch element shown on the gear 37, the reel is driven by the engine to wind the cable therearound and draw the entire device across the field toward the anchor. It will be observed in this connection that as gear 37 engaging with gear 38 winds the reel, simultaneously with this winding movement the various rollers 42 are also turned sufficiently that the cable is always held within the grooves 43. This is attained through the medium of the various gears 40, 45 and 46, it being apparent that if this structure was not present the rotation of the reel would shift the cable to one end of the reel until stopped by either the gear 38 or plate 39. The cable 48 behind the tractor is carried over the two pulleys 57 and the pulley 51 and is secured to an anchor at the opposite end of the field. The distance between pulleys 49 and 51 is the width of the strip of ground that any tool drawn behind the tractor covers and if a wider strip of ground is to be worked a bar may be secured to the support 52$^a$ to extend the pulley 51 laterally beyond the side of the tractor. The cable behind the tractor has its slack taken up by the spring 58, it being apparent that crank 55 may be rotated to impart any desired tension to the spring 58 and that this tension is transmitted to the cable to take up the slack between the tractor and the anchor behind it. When the end of the field is reached the clutch is shifted and the tractor moved laterally (referring to Fig. 1) to the left. The cable is then disassociated from the pulleys 51 and 57 at the rear end and is threaded over the pulleys 57 and 51 at the opposite end as indicated in dotted lines in Fig. 1, the engines reversed and the tractor then drawn back across the field, it being evident that in order to change the cable 48 at the lower end in Fig. 1 from the full line position to the dotted line position the anchor must be moved over a corresponding distance, this moving of the anchor occurring whenever the end of a field is reached. In practice I prefer to set two posts a distance apart and stretch a heavy chain between them to different links of which the cable may be attached so that at each passage of the tractor across the field a new post need not be set.

Various changes in detail of construction may be resorted to without departing from my invention which is defined in the appended claims. Accordingly I do not wish to be limited to the specific structure disclosed but consider myself entitled to all modifications of structure falling within the scope of the claims.

I claim:—

1. In a tractor, a platform, axles at each end of the platform, wheels mounted to turn about vertical axes one at each end of each axle, an engine on the platform, means interposed between the engine and the wheels for driving all of them simultaneously in the same direction, a reel mounted on the platform around which a cable may be wound, and means for alternately connecting the engine with the reel and the wheel driving mechanism, substantially as described.

2. In a tractor, a cable carrying reel comprising a shaft, spaced apart circular members fixed thereon, a plurality of shafts disposed between and loosely mounted on said members, a pinion loosely mounted on one end of the first shaft, means to hold said pinion against rotation, gearing connections between the pinion and all of said plurality of shafts, a roller having a helical groove cut in its surface fixed on each of said plurality of shafts, and means to drive one of said members, substantially as described.

3. In a tractor, a platform, an engine on the platform, wheels for carrying the platform, a reel comprised of a separated gear and plate with shafts interposed between mounted on a central shaft on the platform, a roller having a helical groove cut in its surface fixed to each of said shafts, a pinion loosely mounted at the end of the central shaft and fixed to the journal box therefor, a pinion to the end of each of said shafts, idle pinions interposed between the central pinion and said other pinions, an engine shaft driven by the engine, a pinion meshing with the gear and loosely mounted on the engine shaft, and means to drive said pinion from the engine shaft.

4. In a tractor, a platform, an engine on the platform, wheels for carrying the platform, a reel mounted on the platform, means to drive the reel from the engine, a cable wound around the reel having its ends extending in opposite directions from the reel and a slack take-up device secured to an end of the platform through which one end of the cable passes.

5. In a tractor, a platform, an engine on the platform, wheels for carrying the platform, a reel mounted on the platform, means for connecting the reel to the engine for driving thereby, a bracket having a pulley thereon mounted on the platform at each end substantially in alinement with the reel, a second bracket having a pulley thereon mounted at each end and to one side of the platform, and a slack take-up device mounted on the platform at each end between said pulleys.

6. In a tractor, a platform, an engine on the platform, wheels for carrying the platform, a reel mounted on the platform, means for connecting the reel to the engine for driving the same, a bracket carrying a pulley attached to each end of the platform in substantial alinement with the reel, a second bracket carrying a pulley mounted at each end and to one side of the platform, a third bracket connected at each end of the platform between the other two brackets, a divided shaft on said third bracket, a coiled spring connecting the parts of the shaft, a crack on one end of the shaft, a pawl on the crank, a ratchet on the bracket with which the pawl engages, a member on the other end of the shaft, and a pair of spaced apart pulleys mounted on said member.

7. In a tractor, a cable carrying reel comprising a shaft, a pinion at one end thereof, spaced apart members on the shaft, a plurality of shafts disposed between and loosely mounted on said members, gearing connections between said pinion and all of said plurality of shafts, means to hold the pinion against rotation and a roller having a helical groove cut therein fixed to each of said plurality of shafts, substantially as described.

8. In a tractor, a platform, axles at each end of the platform, wheels mounted to turn about vertical axes one at each end of each axle, a connecting rod between the wheels at each end of the platform, a post on the platform, a rod extending therethrough, a wheel on the upper end of the rod, a beveled pinion on the lower end of said rod, shafts extending in either direction from said pinion, a worm on one end of each shaft, a worm gear mounted on each axle with which said worms engage, an arm connected with each worm gear and with the adjacent connecting rod, beveled pinions movably mounted on the shafts adjacent the first mentioned pinion, bell crank levers pivoted to the post and engaging with said pinions, operating levers pivotally mounted to the post below the wheel, and connecting rods between said levers and the bell crank levers.

9. In a tractor, a cable carrying drum including two spaced apart rotatably mounted members, a plurality of shafts located between and rotatably mounted on said members, each shaft being provided with a roller having a helical groove cut around the face thereof, means to drive said members, and means to turn said shafts in the opposite direction with respect to the rotation of said members when said members are rotated, substantially as described.

In testimony whereof I affix my signature.

ANDREW HUBERT.

Copies of this patent may be obtained for five cents each, by addressing the "Commissioner of Patents, Washington, D. C."